United States Patent [19]

King, Jr.

[11] 4,012,885
[45] Mar. 22, 1977

[54] REVERSE TAPER FASTENER SYSTEM

[76] Inventor: John O. King, Jr., 3990 N. Ivy Road, Atlanta, Ga. 30342

[22] Filed: Mar. 3, 1975

[21] Appl. No.: 554,762

[52] U.S. Cl. .................................. 403/408; 85/1 R; 85/7

[51] Int. Cl.$^2$ ........................................... F16B 5/00

[58] Field of Search .......... 403/279, 282, 388, 408; 52/758 C, 758 D, 758 F; 85/1 R, 7, 77, 78

[56] References Cited

UNITED STATES PATENTS

| | | | |
|---|---|---|---|
| 2,450,820 | 10/1948 | Wilcox | 85/19 |
| 3,377,907 | 4/1968 | Hurd | 85/78 |
| 3,578,367 | 5/1971 | Harvill | 52/758 F |
| 3,748,948 | 7/1973 | Schmitt | 85/1 R |
| 3,779,127 | 12/1973 | Speakman | 85/7 |
| 3,951,561 | 4/1976 | Speakman | 403/279 |

Primary Examiner—Wayne L. Shedd
Attorney, Agent, or Firm—B. J. Powell

[57] ABSTRACT

A reverse taper fastener system including a fastener pin having an elongate bearing section adapted to extend through holes in the work pieces where the bearing section tapers inwardly from the leading end toward the trailing end of the bearing section, having an enlarged head integral with the trailing end of the bearing section, and a pintail section at the leading end of the fastener pin which may carry an expansion collet for expanding the holes from a diameter smaller than the bearing section to a diameter larger than same for installing the fastener. The disclosure also comprehends the method of installing the fastener as well as the method of manufacturing the fastener.

28 Claims, 25 Drawing Figures

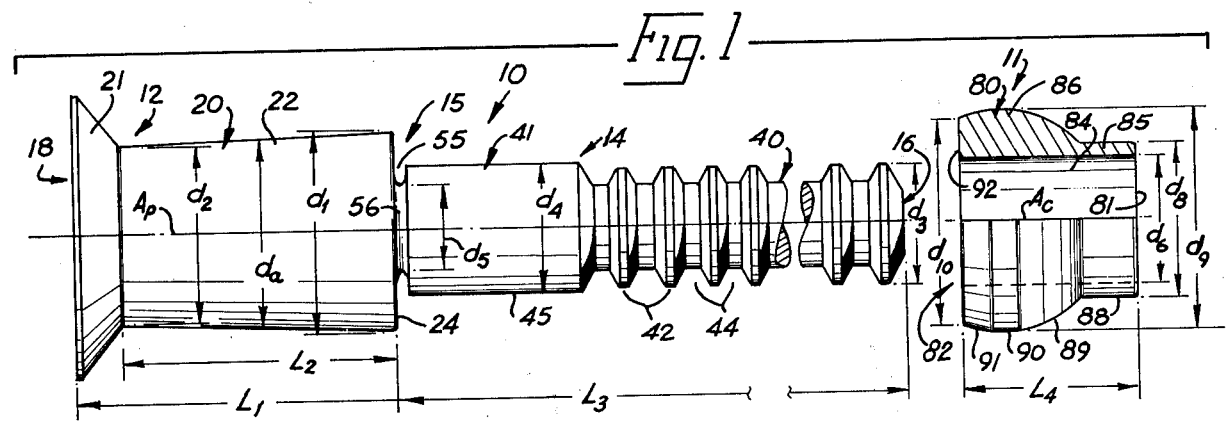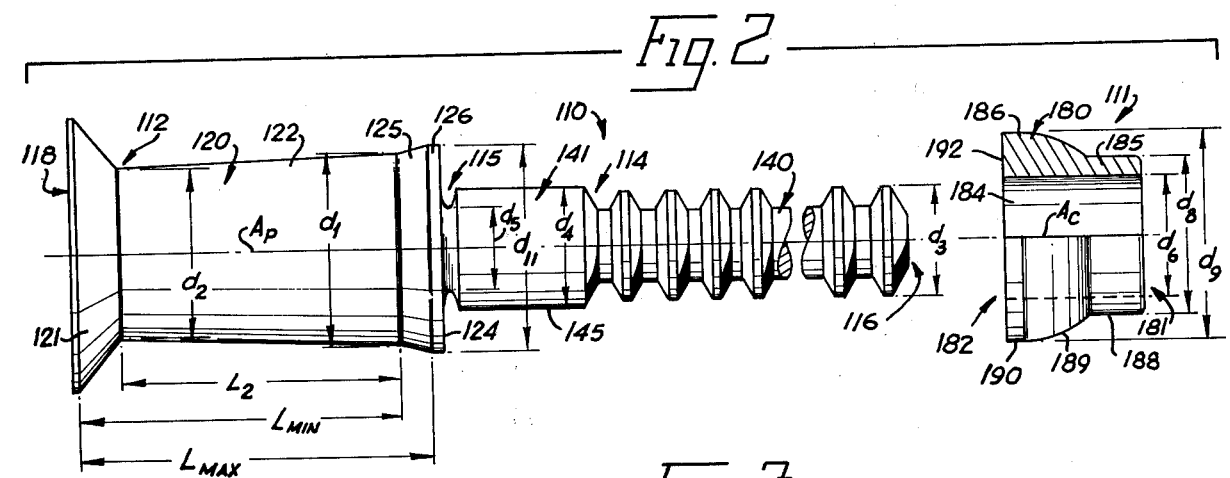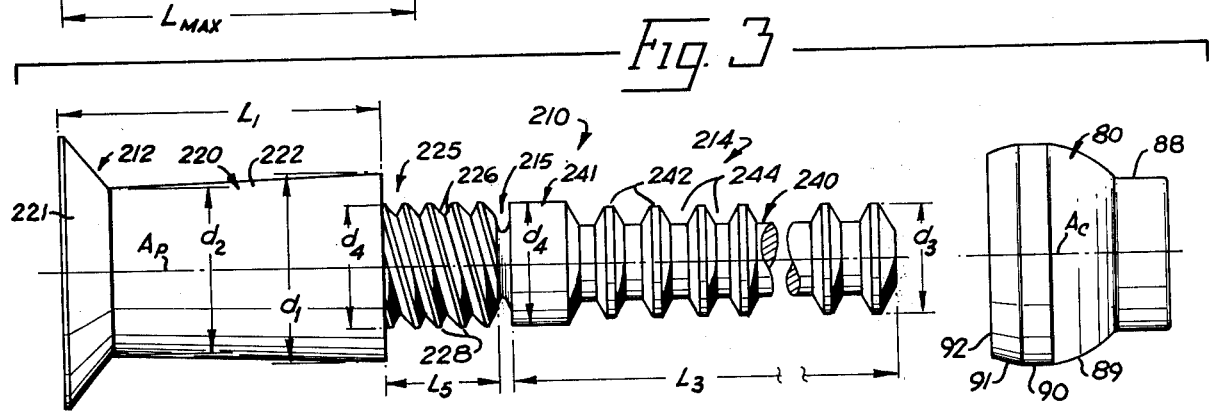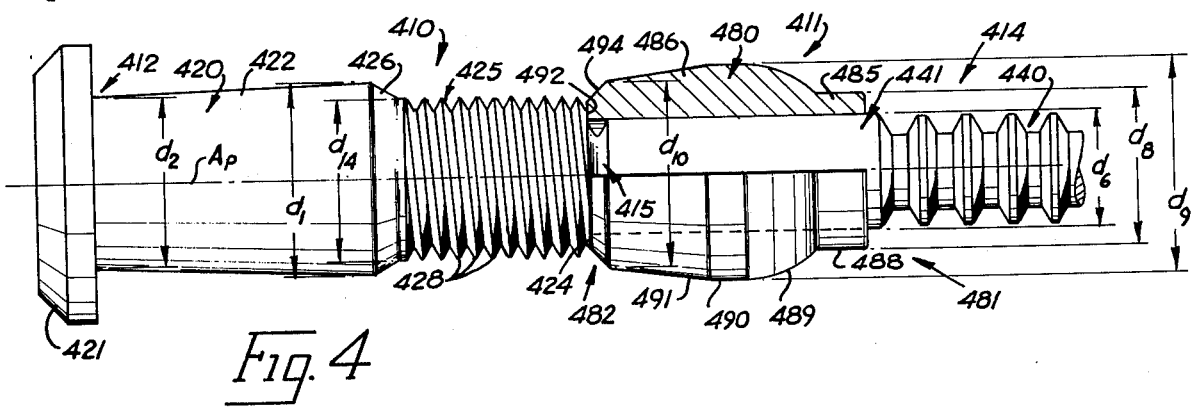

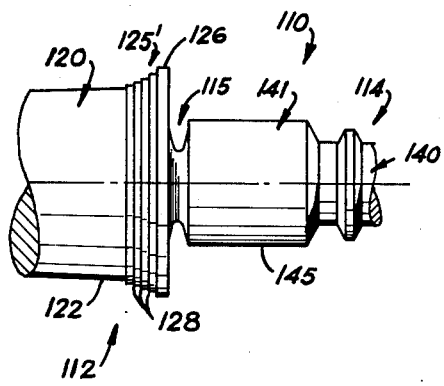
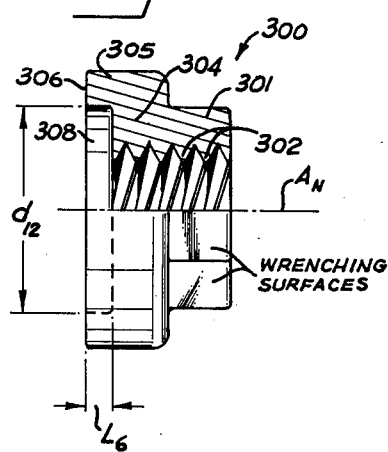
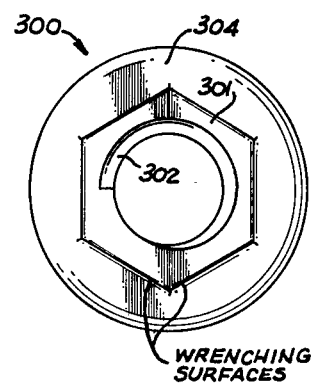
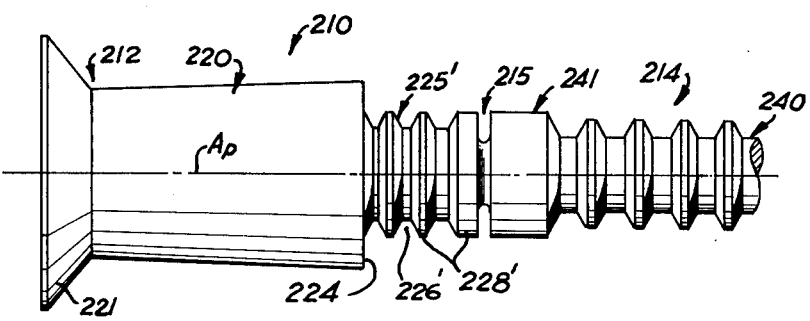
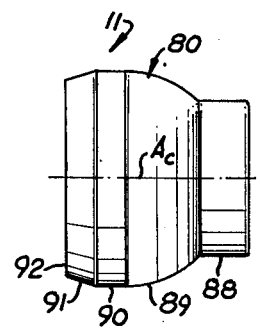
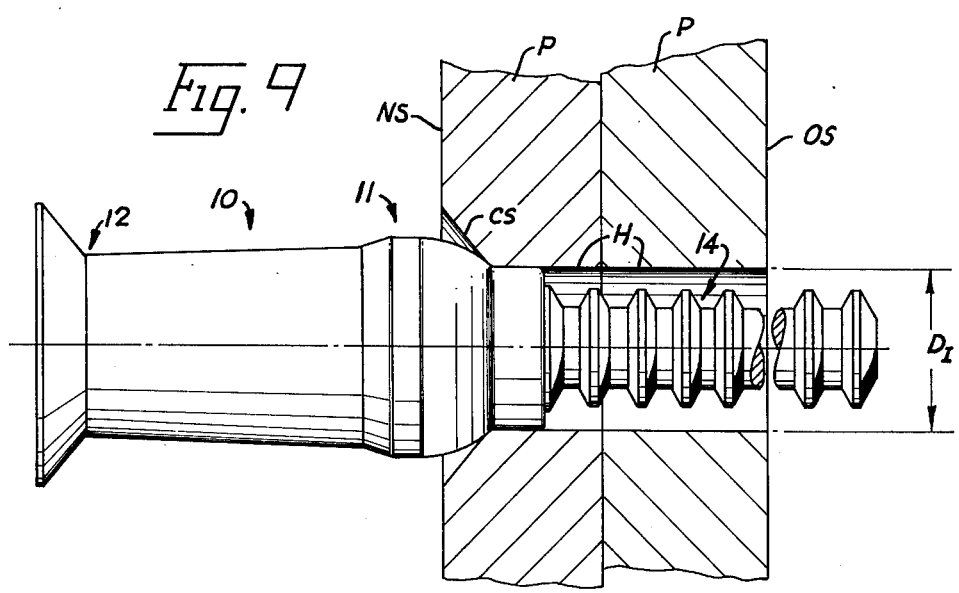

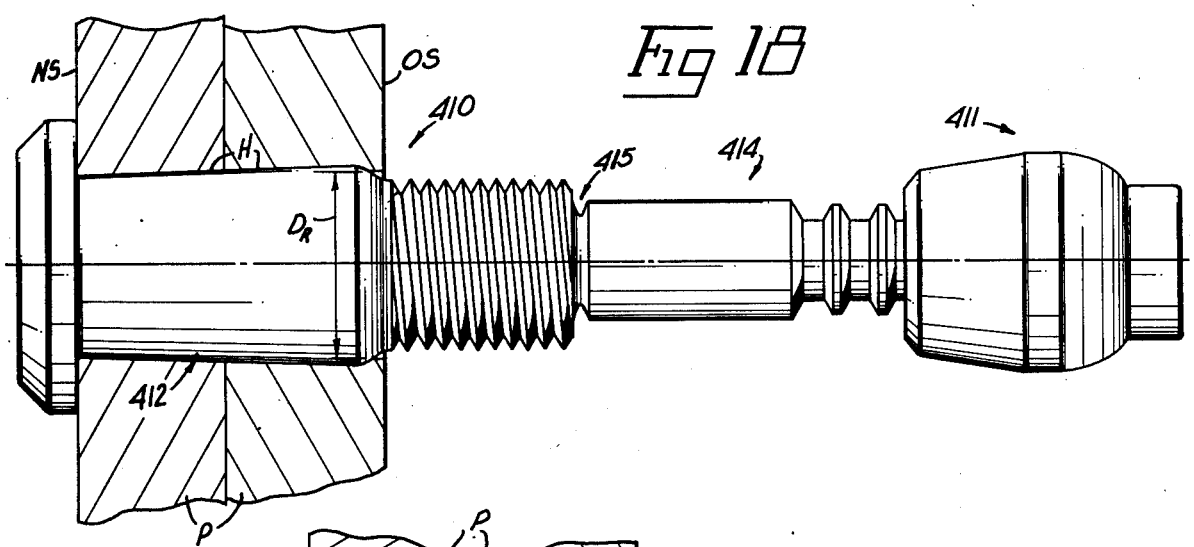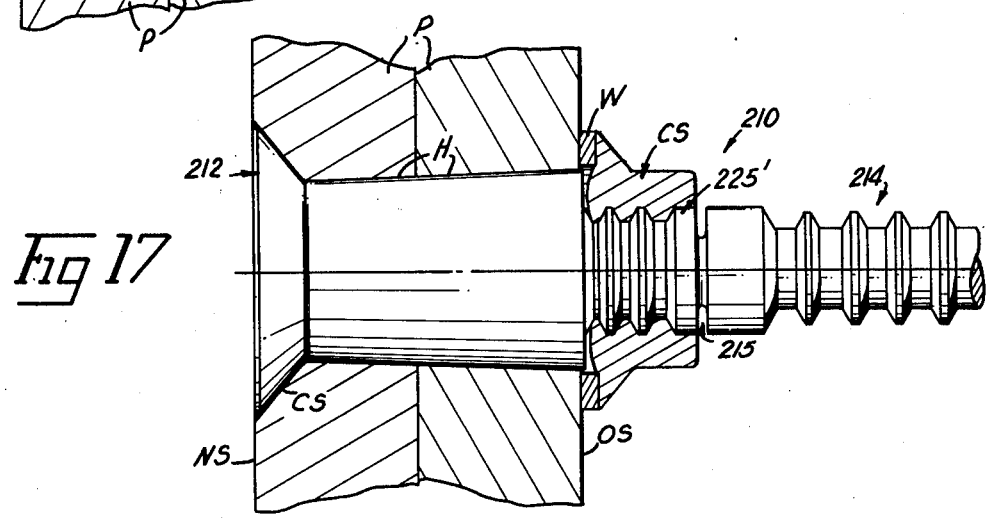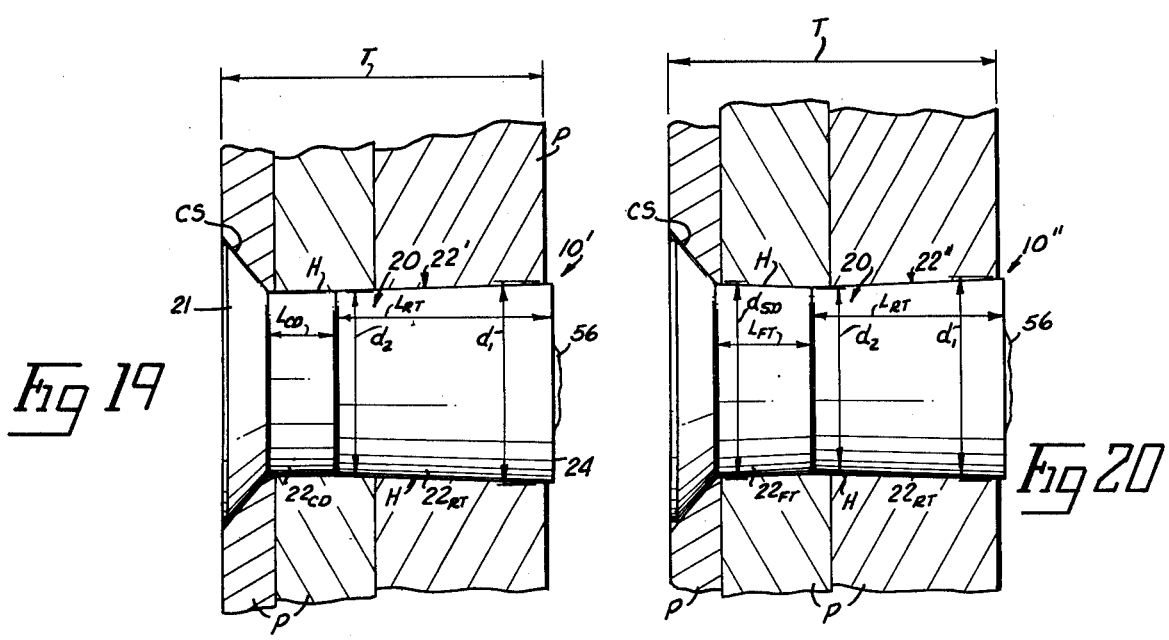

ary of the invention

REVERSE TAPER FASTENER SYSTEM

BACKGROUND OF THE INVENTION

Many highly stressed fastener joints are used today, especially in the aerospace industry. Such fastener joints generally use a fastener with a head at one end, a bearing section which can be extended through the holes in the work pieces integral with the head and an engagement section at the opposite end of the bearing section which is designed to be engaged by a locking device such as a nut or collar to maintain the fastener in position. Two important criteria are usually followed in such fastener joints, the first being the maintenance of good bearing contact between the fastener and the work pieces and the second being the keeping of the weight of the fastener joint at a minimum.

Generally, two types of fasteners are used in these fastener joints. The first type of fastener is a fastener having a substantially constant diameter bearing section that is placed through substantially constant diameter holes in the work pieces and the second type is a fastener with a tapered bearing section that tapers outwardly from the engagement section toward the head which is placed in a correspondingly tapered hole through the work pieces. While tapered fasteners such as those disclosed in U.S. Pat. Nos. 3,034,611 and 3,304,109 do produce fastener joints with good bearing contact between the bearing section of the fastener and the work pieces, the major difficulty with using such fastener systems is that it is extremely difficult to produce the correct tapered hole through the work pieces. It will also be noted that such tapered fasteners tend to be forced out of the holes, head end first, thereby requiring a strong locking device such as a nut or collar to retain the fastener in place. When using a constant diameter bearing section fastener system, the hole forming process is considerably simplified, however, it is more difficult to obtain good bearing between the bearing section of the fastener and the work pieces. The requirement of these prior art systems of a locking device such as a nut or collar has resulted in the systems remaining relatively heavy thereby reducing the overall pay load of the structure in which they are used.

Techniques have also been developed for increasing the fatigue life of the joint. One of these techniques is commonly known as coldworking wherein the hole is expanded to such an extent that the metal immediately surrounding the holes where the localized expansion occurs is stressed beyond its compressive yield point and after which the hole is permitted to return or rebound toward its original diameter to establish a compressive stress gradient immediately surrounding the hole. Such coldworking techniques are disclosed in U.S. Pat. Nos. 3,434,327; 3,566,662; and 3,805,578. Another technique which has been used in this regard is commonly known as an interference fit where the diameter of the bearing section of the fastener is greater than the nominal diameter of the holes in which the fastener is fitted. The techniques of coldworking and interference fit have been combined in special fasteners such as disclosed in U.S. Pat. Nos. 3,578,267 and 3,779,127. It will be seen that the fasteners used in these techniques also require the locking device such as a nut or collar thereon to retain the fastener in place.

SUMMARY OF THE INVENTION

These and other problems and disadvantages associated with the prior art are overcome by the invention disclosed herein in that a reverse tapered bearing section is provided on the fastener which serves to retain the fastener in position within the work pieces while at the same time insuring good bearing contact between the bearing section of the fastener and the work pieces. This allows the locking device such as the nut or collar to be completely eliminated in a shear application and the locking device to be reduced in weight in tension applications. The invention is installed by expanding the holes from a diameter less than the major diameter of the bearing section of the fastener out to an expanded diameter greater than the major diameter of the bearing section and inserting the bearing section while the holes are expanded. The holes are allowed to rebound around the bearing section to engage same. The resulting joint is not only an interference fit but also has been coldworked to produce the ultimate strength and fatigue life. An installation using the invention is greatly simplified, especially where no locking device is required thereby reducing the installation cost of the fastener of the invention.

The apparatus of the invention includes a fastener which has an elongate bearing section adapted to extend through aligned holes in work pieces with a head integral with one end of the bearing section. The bearing section tapers inwardly from its leading end toward its trailing end so that when the holes through the work pieces are expanded to allow the fastener to be installed, the holes recover to a diameter smaller than the major diameter of the bearing section so that an inerference fit is obtained. The compressive force gradient about the hole acts on at least a major portion of the bearing surface on the bearing section of the fastener to try to force the fastener through the holes in the direction away from the head of the fastener so that the work pieces themselves serve to lock the fastener in place and reduce or eliminate the external force required to retain the fastener in the holes. If significant tension forces are present in the fastener joint, a nut or other locking device may be installed on an engagement section on the leading end of the bearing section of the fastener to absorb the tension load.

These and other features and advantages of the invention are disclosed herein and will become more clearly understood upon consideration of the following specification and accompanying drawings wherein like characters of reference designate corresponding parts throughout the several views and in which:

BRIEF DESCRIPTION OF THE DRAWINGS

FIG. 1 is an exploded elevational view of a first embodiment of the invention;

FIG. 2 is an exploded elevational view of a second embodiment of the invention;

FIG. 3 is an exploded elevational view of a third embodiment of the invention;

FIG. 4 is an elevational view shown partly in cross-section of a fourth embodiment of the invention;

FIG. 5 is a partial elevational view of a modification of the second embodiment of the invention;

FIG. 6 is an elevational view shown partly in cross-section of a special nut for use with the third embodiment of the invention shown in FIG. 3;

FIG. 7 is an end view of the nut of FIG. 6;

FIG. 8 is an exploded side elevational view of a modification of the third embodiment of the invention seen in FIG. 3;

FIGS. 9–13 illustrate the installation of the first embodiment of the invention;

FIG. 17 is a view illustrating the invention of FIG. 8 installed;

FIG. 18 is a view illustrating the installation of the fourth embodiment of the invention shown in FIG. 4;

FIG. 19 is a cross-sectional view of a joint incorporating a first modification of the first embodiment of the invention seen in FIG. 1;

FIG. 20 is a cross-sectional view of a joint incorporating a second modification of the first embodiment of the invention seen in FIG. 1;

Figure 10:
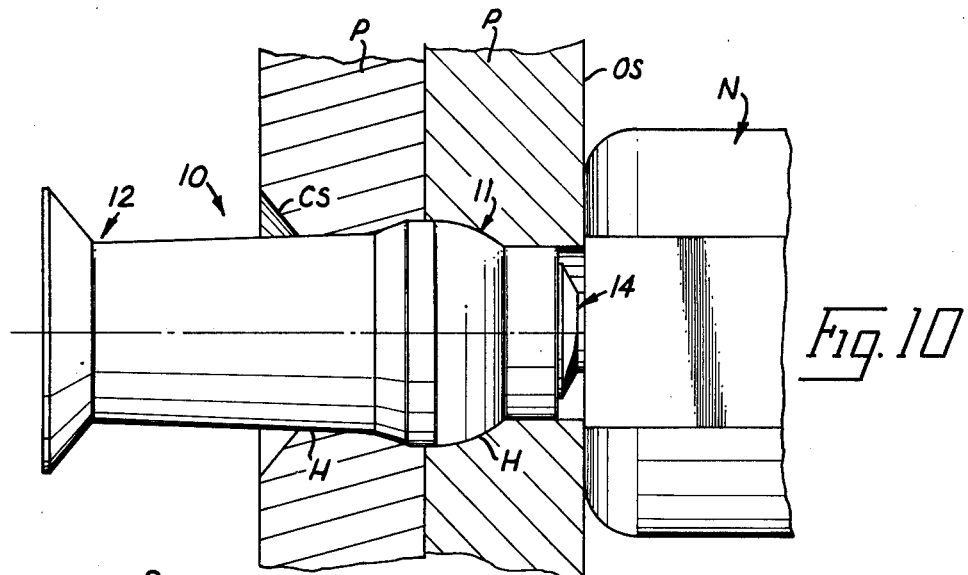

These figures and the following detaild description herein disclose specific embodiments of the invention, however, it is to be understood that the inventive concept is not limited thereto and may be embodied in other forms.

DETAILED DESCRIPTION OF ILLUSTRATIVE EMBODIMENTS

Referring to FIG. 1, it will be seen that the first embodiment of the invention includes a fastener pin 10 and a hole expansion collet 11 adapted to be carried by the fastener pin 10 as the fastener pin 10 is installed in the holes through the work pieces as will become more apparent. The fastener pin 10 includes generally a fastener portion 12 and a pintail portion 14 coaxially connected to the fastener portion 12 about the pin axis $A_p$ through a breakneck section 15. It will further be seen that the pin 10 has a leading end 16 and a trailing end 18. The fastener portion 12 includes a bearing section 20 which is integral with the breakneck section 15 at its leading end and integral with an enlarged head 21 at its trailing end. The head 21 illustrated is of the countersunk type, however, it is to be understood that different head styles can be used depending on the particular application without departing from the inventive concept. The bearing section 20 defines an external bearing surface 22 thereon which is concentrically arranged about the axis $A_p$ and tapers inwardly uniformly from the leading end of the bearing section 20 to the trailing end thereof. The leading end of the bearing surface 22 has a major prescribed diameter $d_1$ and the trailing end of the surface 22 has a minimum prescribed diameter $d_2$ as will be more fully explained. It will thus be seen that the bearing surface 22 has a reverse taper thereon from that normally associated with fasteners. A leading end of the bearing section 20 defines an annular driving face 24 thereon about the breakneck section 15 which is arranged normal to the axis $A_p$ of the pin 10. It will also be noted that the fastener portion 12 has an effective maximum grip length $L_1$ which is longer than the length $L_2$ of the bearing section 20 as is normally associated with fasteners with countersunk heads. For an exposed head fastener portion, the grip length $L_1$ would be equal to the length $L_2$ of the bearing section 20.

The pintail portion 14 of the fastener pin 10 defines a pulling section 40 on the leading end thereof and a support section 41 on the trailing end thereof which is integral with the breakneck section 15. It will also be noted that the pintail portion 14 has an effective length $L_3$ as will become more apparent. The pulling portion 40 has a configuration normally associated with lockbolt type fasteners with alternating ridges 42 and grooves 44 to be gripped by the pulling nose assembly of a conventional lockbolt installation tool as will be more fully explained. It will be noted that the pulling section 40 has a maximum diameter $d_3$ such that the pulling section 40 can be inserted into the nose assembly of the lockbolt pulling gun. The trailing end of the pulling section 40 is integral with the leading end of the support section 41 so that the fastener pin 10 is a unitary structure. The support section 41 has a cylindrical support surface 45 thereon which is concentric about the axis $A_p$ with the support surface 45 having a substantially constant diameter $d_4$ less than the diameter $d_1$ as will become more apparent. The breakneck section 15 defines a breakneck groove 55 therein to produce a reduced diameter frangible section 56 with diameter $d_5$ smaller than the minimum diameter of the pulling section 40 to insure that the fastener pin 10 will fracture at the frangible section 56.

The collet 11 is removably received on the pintail portion 14 and supported by the support section 41 to expand the holes through the work pieces immediately preceding the bearing section 20 as the fastener pin 10 is installed. The collet 11 has an annular side wall 80 concentric about the collet central axis $A_c$ with a leading end 81 and a trailing end 82. The side wall 80 defines a cylindrical passage 84 therethrough with a diameter $d_6$ which is just sufficient for the collet 11 to be slidably received onto the support surface 45 of the pintail portion 14 on pin 10 and be in bearing support thereon. The diameter $d_6$ is usually no more than 0.001 inch greater than the diameter $d_4$ of the support surface 45. The collet 11 has a length $L_4$ which is substantially equal to the sum of the length of the support section 41 and the breakneck section 15.

The side wall 80 includes a leading pilot section 85 and a trailing expansion section 86 integral with the trailing end of the pilot section 85. The pilot section 85 defines a cylindrical pilot surface 88 on the outside thereof concentric about the collet central axis $A_c$. The pilot surface 88 has an outside diameter $d_8$ which is sufficient to locate the collet 11 coaxially with the centerline of the holes through the work pieces when the surface 88 extends into the holes as will become more apparent. Normally, the diameter $d_8$ of the pilot surface 88 is in the order of 0.001 inch less than the initial hole diameter as will be explained.

The expansion section 86 includes a leading expansion surface 89, an intermediate land surface 90 and a trailing contraction surface 91, all concentric about the central axis $A_c$ of the collet 11. The expansion surface extends outwardly from the diameter $d_8$ of the pilot surface 88 to a major diameter $d_9$ at its trailing end. The diameter $d_9$ is greater than the initial hole diameter through the work pieces by the amount which it is desired to expand the holes. It will be noted that the diameter $d_9$ must be greater than the major diameter $d_1$ of the bearing section 20 as will become more apparent. If optimum coldworking is desired, the diameter $d_9$ is usually 2–10% greater than the hole diameter of the initial hole diameter through the work pieces as set forth by known data and depends on the material of the work pieces and the desired final diameter of the holes. While different shapes may be provided for the expansion surface 89, the surface 89 illustrated is semi-ellipsoidal in shape where the included angle between the tangent to the surface 89 at any point decreases from the leading to the trailing end of the surface 89. It will be seen that such shapes of surface 89 produces an exponentially increasing mechanical advantage at the surface 89/hole interface from the leading to the trailing end of the surface 89. This serves to minimize the frictional interface between the surface 89 which, in turn, reduces the force required to move the surface 89 through the holes. The land surface 90 is cylindrical with the maximum expansion diameter $d_9$ and is smoothly joined to the expansion surface 89 at its leading end. The contraction surface 91 is smoothly joined to the trailing end of the land surface 90 and tapers inwardly from the diameter $d_9$ of the land surface 90 to a trailing minor diameter $d_{10}$ which is at least as large as the major diameter $d_1$ on the bearing section 20 of fastener pin 10 as will beccome more apparent. The trailing end of the side wall 80 defines a rearwardly facing annular driving face 92 thereon which is concentrically located about the axis $A_c$ and lies in a plane normal to the axis. The trailing driven face 92 on the collet 11 is adapted to be engaged by the leading driving face 24 on the bearing section 20 of the fastener pin 10 to cause the collet 11 to be forced through the holes in the work pieces by pulling on the pulling section 40 of the pintail portion 14, as will be explained.

Referring to FIG. 19, a first modification of the fastener pin is illustrated after it is installed and designated 10'. The only difference between the fastener pin 10' in FIG. 19 and the pin 10 of FIG. 1 is in the external bearing surface on the bearing section 20 which has been designated as 22'. The bearing surface 22' has a leading reverse taper surface section $22_{RT}$ located on the leading portion of the bearing section 20 and a trailing constant diameter surface section $22_{CD}$ extending between the trailing end of the leading surface section $22_{RT}$ and the head 21 of the support pin 10'. The leading reverse taper surface section $22_{RT}$ has a length $L_{RT}$ less than the length of holes H or the material thickness T and the surface section $22_{CD}$ has a length $L_{CD}$. The reverse taper surface section $22_{RT}$ tapers inwardly from the leading diameter $d_1$ at the leading end of the bearing section 20 to the trailing minor diameter $d_2$ at the trailing end of the surface section $22_{RT}$. It will also be noted that the surface section $22_{CD}$ has the substantially constant diameter $d_2$ along its length. Preferably, the length $L_{RT}$ at the surface section $22_{RT}$ should be a major portion of the total thickness of the work pieces P through which the fastener pin 10' extends to insure that the fastener pin 10' will be held in position by the reverse taper subsurface $22_{RT}$ as set forth hereinabove. The fastener 10' will be installed in the same manner as the fastener 10. The material of the work pieces P about the holes H would contract and be in bearing contact with the reverse taper subsurface $22_{RT}$ as well as the constant diameter subsurface $22_{CD}$.

Referring to FIG. 20, a second modification of the fastener pin is illustrated after it is installed and designated 10''. The only difference between the fastener pin 10'' in FIG. 19 and the pin 10 of FIG. 1 is in the external bearing surface on the bearing section 20 which has been designated as 22''. The bearing surface 22'' has a leading reverse taper subsurface $22_{RT}$ located on the leading portion of the bearing section 20 and a forward taper subsurface $22_{FT}$ extending between the trailing end of the leading subsurface $22_{RT}$ and the head 21 of the support pin 10''. The leading reverse taper subsurface $22_{RT}$ has a length $L_{RT}$ less than the length of holes H or material thickness T and the subsurface $22_{FT}$ has a length $L_{FT}$. The reverse taper subsurface $22_{RT}$ tapers inwardly from the leading diameter $d_1$ at the leading end of the bearing section 20 to the trailing minor diameter $d_2$ at the trailing end of the subsurface $22_{RT}$. It will also be noted that the trailing foward taper subsurface $22_{FT}$ tapers uniformly outwardly from the minor diameter $d_2$ to a trailing secondary major diameter $d_{SD}$ at the trailing end of the bearing section 20. The diameter $d_{SD}$ is larger than diameter $d_2$ and is usually smaller than the major expansion diameter $d_9$ of collet 11 used to install fastener 10''. Preferably, the length $L_{RT}$ at the subsurface $22_{RT}$ should be a major portion of the total thickness of the work pieces P through which the fastener pin 10'' extends to insure that the fastener pin 10'' will be held in position by the reverse taper subsurface $22_{RT}$ as set forth hereinabove. The fastener 10'' would be installed in the same manner as the fastener 10. The material of the work pieces P about the holes H would contract in and be in bearing contact with the reverse taper subsurface $22_{RT}$ as well as the forward taper subsurface $22_{FT}$.

Figure 24:
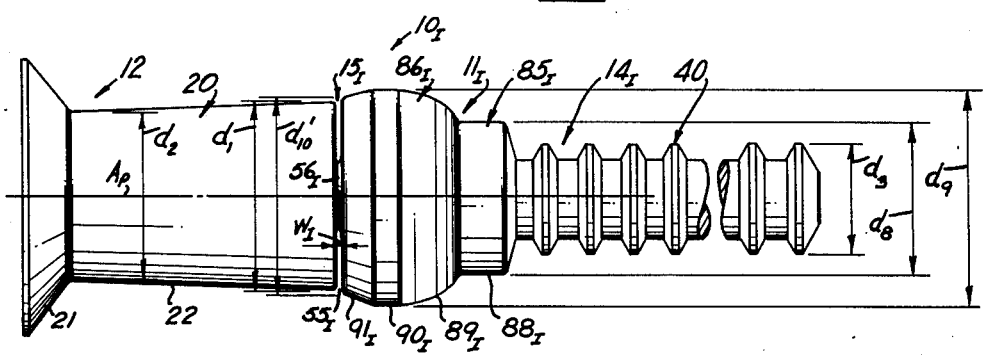
FIG. 24 is an elevational view of a third modification of the first embodiment of the invention seen in FIG. 1; and, FIG. 25 is a view illustrating the invention of FIG. 24 being installed.

Referring to FIG. 24, a third modification of the first embodiment of the fastener pin is shown and designated $10_I$. The modifying fastener pin $10_I$ has the expansion collet integral with the trailing end of the pintail portion $14_I$ as an expansion member $11_I$. The expansion member $11_I$ replaces the collet and support section of the pintail as shown in FIG. 1. The expansion member $11_I$ has a leading pilot section $85_I$ corresponding to the pilot section 85 on the collet 11 and a trailing expansion section $86_I$ integral with the trailing end of the pilot section $85_I$ with the expansion section $86_I$ corresponding generally to the expansion section 86 on the collet 11. The pilot section $85_I$ defines a cylindrical pilot surface $88_I$ on the outside thereof concentric about the central axis $A_p$ of the pin $10_I$. The surface $88_I$ serves the same purpose as the surface 88 on the collet 11. The expansion section $86_I$ includes a leading expansion surface $89_I$, an intermediate land surface $90_I$ and a trailing contraction surface $91_I$, all concentric about the central axis $A_p$ of the pin $10_I$. The surfaces $89_I$, $90_I$ and $91_I$ correspond in size and function to the surfaces 89, 90 and 91 of the collet 11. The leading end of the expansion member $11_I$ is integral with the trailing end of the pulling section 40 of pintail portion $14_I$.

Figure 25:
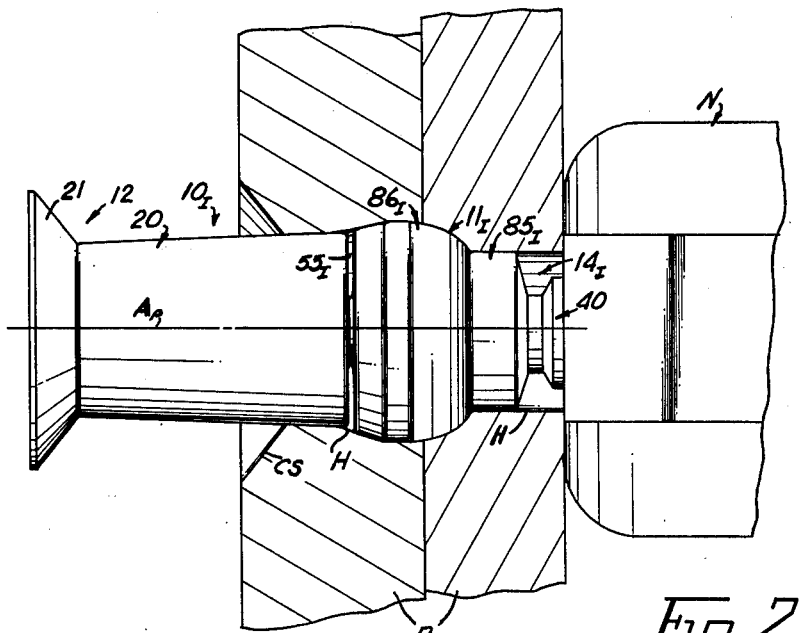

The breakneck section $15_I$ is provided between the trailing end of the expansion member $11_I$ and the leading end of the bearing section 20 on the fastener portion 12. The breakneck section $15_I$ includes a groove $55_I$ which leaves a reduced diameter frangible section $56_I$ connecting the trailing end of the expansion member $11_I$ with the leading end of the bearing section 20. The frangible section $56_I$ serves the same purposes as frangible section 56 in the fastener pin 10. The remaining components of the fastener pin $10_I$ are the same as the fastener pin 10 and the same reference numerals applied to the fastener pin 10 are also applied to the fastener pin $10_I$. The trailing diameter $d_{10}'$ of the expansion member $11_I$ is sufficiently larger than the leading diameter $d_1$ of the bearing section 20 and the width $W_I$ of the breakneck groove $55_I$ is sufficiently small to permit the leading end of the bearing section 20 to pass into the holes H as seen in FIG. 25 before the diameter of the holes have recovered to a diameter smaller than the diameter $d_1$.

SECOND EMBODIMENT

Referring to FIG. 2, it will be seen that the second embodiment of the invention is to be used similarly to the first embodiment and includes a fastener pin 110 and a hole expansion collet 111 adapted to be carried by the fastener pin 110 as the fastener pin 110 is installed in the holes through the work pieces. The fastener pin 110 includes generally a fastener portion 112 and a pintail portion 114 coaxially connected to the fastener portion 112 about the pin axis $A_p$, through a breakneck section 115. It will further be seen that the pin 110 has a leading end 116 and a trailing end 118. The fastener portion 112 includes a bearing section 120 which is integral with the breakneck section 115 at its leading end and integral with a head 121 at its trailing end. The head 121 illustrated is of the countersunk type.

The bearing section 120 defines a primary external bearing surface 122 thereon which is concentrically arranged about the axis $A_p$ and tapers inwardly uniformly from the leading end of the bearing section 120 to the trailing end thereof. The leading end of the bearing surface 122 has the major prescribed diameter $d_1$ and the trailing end of the surface 122 has the minimum prescribed diameter $d_2$ similarly to surface 22. The bearing section 120 also defines a secondary grip adjustment surface 125 concentric about the pin axis $A_p$, immediately leading the primary bearing surface 122. The trailing end of surface 125 is smoothly joined to the leading end of the surface 122 and uniformly tapers outwardly and forwardly therefrom from the leading diameter $d_1$ of surface 122 to a larger diameter $d_{11}$ no larger than the maximum expansion diameter $d_9$ of collet 111 as will be explained. The leading end of the tapered grip adjustment surface 125 may be smoothly joined to a narrow cylindrical land lead-in surface 126 with the diameter $d_{11}$. It will thus be seen that both the primary bearing surface 122 and the grip adjustment surface 125 have a reverse taper thereon from that normally associated with fasteners. The leading end of the bearing section 120 defines the driving face 124 thereon about the breakneck section 115 which is arranged normal to the axis $A_p$ of the pin 110. The fastener portion 110 has an effective grip range from the minimum grip length $L_{min}$ at the juncture of surfaces 122 and 125 to the maximum grip length $L_{max}$ at the land lead-in surface 126.

The pintail portion 114 is the same as pintail portion 14 of fastener pin 10 with the pulling section 140 and support section 141. Pintail portion 114 serves the same function as portion 14 on pin 10.

The collet 111 is removably received on the pintail portion 114 and supported by the support section 141 to expand the holes through the work pieces immediately preceding the bearing section 120 as the fastener pin 110 is installed. The collet 111 has an annular side wall 180 concentric about the collet central axis $A_c$ with a leading end 181 and a trailing end 182. The side wall 180 defines a cylindrical passage 184 therethrough with diameter $d_6$ which is just sufficient for the collet 111 to be slidably received onto the support surface 145 of the pintail portion 141 and be in bearing support thereon.

The side wall 180 includes a leading pilot section 185 and a trailing expansion section 186 integral with the trailing end of the pilot section 185. The pilot section 185 defines a cylindrical pilot surface 188 on the outside thereof concentric about the collet central axis $A_c$. The pilot surface 188 has an outside diameter $d_8$ which is sufficient to locate the collet 111 coaxially with the centerline of the holes through the work pieces when the surface 188 extends into the holes.

The expansion section 186 includes a leading expansion surface 189 and a trailing land surface 190 both concentric about the central axis $A_c$ of the collet 111. The expansion surface extends outwardly from the diameter $d_8$ of the pilot surface 188 to a major diameter $d_9$ at its trailing end. The diameter $d_9$ is greater than the initial hole diameter through the work pieces by the amount which it is desired to expand the holes. It will be noted that the diameter $d_9$ must be greater than the major diameter $d_1$ of the bearing section 120. The land surface 190 is cylindrical with the maximum expansion diameter $d_9$ and is smoothly joined to the expansion surface 189 at its leading end. The diameters of the land surface 190 on the collet 111 is substantially that of the land surface 126 on bearing section 120 so that the surface 126 forms a continuation of the surface 125 as will become more apparent. The trailing end of the side wall 180 defines a rearwardly facing annular driven face 192 thereon which is concentrically located about the axis $A_c$ and lies in a plane normal to the axis. The trailing driven face 192 on the collet 111 is adapted to be engaged by the leading driving face 124 on the bearing section 120 of the fastener pin 110 to cause the collet 111 to be forced through the holes in the work pieces by pulling on the pulling section 140 of the pintail portion 114.

FIG. 5 illustrates a modification of the grip adjustment surface on the leading end of bearing section 120 and is designated 125'. The surface 125' defines a plurality of annular steps 128 which serve to prevent the surface 125' from being forced back through the holes without broaching same.

THIRD EMBODIMENT

Referring to FIG. 3, it will be seen that the third embodiment of the invention includes a fastener 210 and the hole expansion collet 11 adapted to be carried by the fastener pin 210 similarly to pin 10. The pin 210 is designed for applications primarily in shear but with some tension loading. The fastener pin 210 includes generally a fastener portion 212 and a pintail portion 214 coaxially connected to the fastener portion 212 about the pin axis $A_p$ through a breakneck section 215. It will further be seen that the pin 210 has a leading end 216 and a trailing end 218. The fastener portion 212 includes a bearing section 220 integral with the head 221 at its trailing end. The head 221 is illustrated as the countersunk type.

The bearing section 220 defines an external bearing surface 222 thereon which is concentrically arranged about the axis $A_p$ and tapers inwardly uniformly from the leading end of the bearing section 220 to the trailing end thereof. The leading end of the bearing surface 222 has the major prescribed diameter $d_1$ and the trailing end of the surface 222 has the minimum prescribed diameter $d_2$ similar to surface 22. It will thus be seen that the bearing surface 222 has a reverse taper thereon from that normally associated with fasteners. The leading end of the bearing section 220 defines a forwardly facing annular driving face 224 thereon which is arranged normal to the pin axis $A_p$. It will also be noted that the fastener portion 212 has an effective grip length $L_1$ similar to pin 10.

A reduced diameter engagement section 225 is integral with the leading end of the bearing section 220 and coaxial therewith about axis $A_p$. The section 225 has the diameter $d_4$ along its length $L_5$ and is provided with external threads 226. The threads 226 have a crest land surface 228 of diameter $d_4$ to support collet 111 as will become more apparent. It will be seen that diameter $d_4$ is smaller than diameter $d_1$. The leading end of engagement section 225 is integral with breakneck section 215.

The pintail portion 214 of the fastener pin 210 defines a pulling section 240 on the leading end thereof and a support section 241 on the trailing end thereof which is integral with the breakneck section 215. It will also be noted that the pintail portion 214 has effective length $L_3$ as will become more apparent. The pulling portion 240 has the configuration normally associated with lockbolt type fasteners with alternating ridges 242 and grooves 244 to be gripped by the pulling nose assembly of a conventional lockbolt installation tool. It will be noted that the pulling section 240 has a maximum diameter $d_3$ such that the pulling section 240 can be inserted into the nose assembly of the lockbolt pulling gun. The trailing end of the pulling section 240 is integral with the leading end of the support section 241 so that the fastener pin 10 is a unitary structure. The support section 241 has a leading foreshortened cylindrical support surface 245 thereon which is concentric about the axis $A_p$ with the support surface 245 having the substantially constant diameter $d_4$ so that surface 245 forms a continuation of the crest land surfaces 228 on threads 226 on engagement section 225 to support collet 11 thereon. The sum of the lengths of the engagement section 225, breakneck section 215 and support section 241 is approximately the length of collet 11.

FIGS. 6 and 7 illustrate a special nut 300 for use on engagement section 225 of fastener pin 210. The nut 300 has an annular side wall 301 with internal threads 302 complimentary to threads 226 on engagement section 225. This allows nut 300 to be screwed onto engagement section 225 after the pintail portion 214 has been fractured therefrom. Nut 300 also has an annular flange 304 integral with the trailing end of side wall 301 and normal to nut axis $A_N$. An annular rearwardly facing lip 305 concentric about axis $A_N$ is integral with the outside edge of flange 304 and defines an annular rearwardly facing bearing face 306 on the trailing end thereof adapted to bear against the work pieces about the bearing section 220 as will become more apparent. The lip 305 defines an opening 308 therein with a diameter $d_{12}$ larger than diameter $d_1$ and the flange 304 is spaced forward of the face 306 a distance $L_6$ greater than the grip variation of pin 210 so that the leading end of bearing section 220 will fit therein.

FIG. 8 shows a fastener pin 210 with a modified engagement section thereon designated 225′. Dimensionally, the section 225′ corresponds to section 225. Rather than threads, section 225′ is designed for use with a swagable collar SC seen in FIG. 17 and has alternating locking grooves 226′ and lands 228′. The lands 228′ have the diameter $d_4$ to support collet 11.

FOURTH EMBODIMENT

Referring to FIG. 4, it will be seen that the fourth embodiment of the invention includes a fastener pin 410 and a hole expansion collet 411 adapted to be carried by the fastener pin 410 as the fastener pin 410 is installed in the holes through the work pieces. The fastener pin 410 includes generally a fastener portion 412 and a pintail portion 414 coaxially connected to the fastener portion 12 about the pin axis $A_p$ through a breakneck section 415. It will further be seen that the pin 410 has a leading end 416 and a trailing end 418. The fastener portion 412 includes a bearing section 420 integral with an engagement section 425 at its leading end and integral with head 421 at its trailing end. The head 421 illustrated is of the protruding type, however, it is to be understood that different head styles can be used depending on the particular application without departing from the inventive concept.

The bearing section 420 defines an external bearing surface 422 thereon which is concentrically arranged about the axis $A_p$ and tapers inwardly uniformly from the leading end to the trailing end thereof. The leading end of the bearing surface 422 has a major prescribed diameter $d_1$ and the trailing end of the surface 422 has a minimum prescribed diameter $d_2$ as will be more fully explained. It will thus be seen that the bearing surface 422 has a reverse taper thereon of that normally associated with fasteners. The leading end of bearing section 420 defines a re-expansion lead-in surface 426 that tapers outwardly from the diameter $d_{14}$ of engagement section 425 at its leading end to the diameter $d_1$ at its trailing end where it is smoothly joined with bearing surface 422.

The engagement section 425 has major diameter $d_{14}$ corresponding to a standard engagement section for the particular size fastener and has standard external threads 428 adapted to receive a standard nut (not shown) thereon. The leading end of the engagement section 425 defines an annular driving face 424 thereon about the breakneck section 415 which is arranged normal to the axis $A_p$ of the pin 410. The pintail section 414 is similar to pintail portion 14 on pin 10 with pulling section 440 and support section 441.

The collet 411 is removably received on the pintail portion 414 and supported by the support section 441 to expand the holes through the work pieces immediately preceding the engagement section 425 as the fastener pin 410 is installed. The collet 411 has an annular side wall 480 concentric about the collet central axis $A_c$ with a leading end 481 and a trailing end 482. The side wall 480 defines a cylindrical passage 484 therethrough with a diameter $d_6$ which is just sufficient for the collet 411 to be slidably received onto the support surface 445 of the pintail portion 414, and be in bearing support thereon.

The side wall 480 includes a leading pilot section 485 and a trailing expansion section 486 integral with the trailing end of the pilot section 485. The pilot section 485 defines a cylindrical pilot surface 488 on the outside thereof concentric about the collet central axis $A_c$. The pilot surface 488 has an outside diameter $d_8$ which is sufficient to locate the collet 411 coaxially with the centerline of the holes through the work pieces when the surface 488 extends into the holes as will become more apparent.

The expansion section 486 includes a leading expansion surface 489, an intermediate land surface 490 and a trailing contraction surface 491, all concentric about the central axis $A_c$ of the collet 411. The expansion surface extends outwardly from the diameter $d_8$ of the pilot surface 488 to a major diameter $d_9$ at its trailing end. The diameter $d_9$ is greater than the initial hole diameter through the work pieces by the amount which it is desired to expand the holes. It will be noted that the diameter $d_9$ must be greater than the major diameter $d_1$ of the bearing section 420 as will become more apparent. While different shapes may be provided for the expansion surface 489, the surface 489 illustrated is semi-ellipsoidal in shape. The land surface 490 is cylindrical with the maximum expansion diameter $d_9$ and is smoothly joined to the expansion surface 489 at its leading end. The contraction surface 491 is smoothly joined to the trailing end of the land surface 490 and tapers inwardly from the diameter $d_9$ of the land surface 490 to a trailing minor diameter $d_{10}$. The trailing end of the side wall 480 defines a rearwardly facing annular driven face 492 thereon which is concentrically located about the axis $A_c$ and lies in a plane normal to the axis. The trailing driven face 492 on the collet 11 is adapted to be engaged by the leading driving face 424 on the engagement section 425 of the fastener pin 410 to cause the collet 411 to be forced through the holes in the work pieces by pulling on the pulling section 440 of the pintail portion 414. A clearance surface 494 may connect the face 492 with contraction surface 491 and angle forwardly of face 492 to clear threads 428 and prevent damage thereto as the pin 410 is installed.

OPERATION

Generally, all the various embodiments of the invention disclosed herein are installed in a similar manner and therefore only the installation of the first embodiment of the invention will be described in detail, with the differences in installation of the other embodiments specifically pointed out. The installation of the first embodiment of the invention is illustrated in FIGS. 9–12.

There is a definite relationship between the diameters $d_1$ and $d_2$ of the bearing section 20 of the fastener pin 10, the maximum expansion diameter $d_9$ of the expansion section 86 and the diameter $d_8$ of the pilot section 85 of the collet 11, the initial hole diameter $D_I$ of the holes H, the recovered hole diameter $D_R$ of the holes H after passage of the collet 11 therethrough, and the final interference average hole diameter $D_f$ when the fastener pin 10 is installed in the holes. Usually, the diameters $d_1$ and $d_2$ of the bearing section 20 of the fastener pin 10 are the controlling diameters since the average diameter $d_a$ based on these diameters correspond to that of a standard size fastener. Thus, if it is desirable to place the bearing section 20 of the fastener pin 10 into an average interference fit of a prescribed amount, such as 0.002 inch, then the recovered hole diameter $D_R$ must be 0.002 inch less than the average diameter $d_a$ of the bearing section 20 of the fastener pin 10. When the material of the work pieces P is known, the recovered hole diameter $D_R$ can be predicted and thus determine the maximum expansion diameter $d_9$ of the expansion section 86 of the collet 11. The diameter $d_9$ can be calculated to be that amount larger than the recovered hole diameter $D_R$ to make the recovered hole diameter $D_R$ the desired amount smaller than the average diameter $d_a$ of the bearing section 20 of the fastener pin 10 for the interference fit. Once the diameter $d_9$ is determined, the initial hole diameter $D_I$ can be determined and is that amount less than the maximum expansion of the holes as determined by the diameter $d_9$ by which it is desired to expand the holes. If it is desirable to coldwork the holes, the amount the holes H are to be expanded is set by the available coldworking data. Once the initial hole diameter $D_I$ is determined, this determines the diameter $d_8$ on the pilot section 85 of the collet 11. It is also to be understood that the difference between the diameters $d_1$ and $d_2$ is limited by the maximum amount of recovery of the holes H after passage of the collet 11 if an interference fit is desired. For instance, if the average diameter $d_a$ were 5/16 inch for the fastener pin 10 to be installed and it is desirable that the bearing section 20 is to be an average interference of 0.002 inch through 7075-T6 aluminum, then the diameter $d_9$ should be 0.315 inch if coldworking is desired to produce an unrestrained recovered hole diameter $D_R$ of 0.308 inch where the initial hole diameter $D_I$ is 0.300 inch. Thus, the diameter $d_8$ of the pilot section 85 on collet 11 should be just slightly less than the initial hole diameter $D_I$ or 0.299 inch. Since it is desirable to have the entire hole surface in bearing contact with the surface 22 on the bearing section 20 of fastener pin 10, the diameter $d_1$ should be 0.311 inch and diameter $d_2$ should be 0.309 inch to give an average interference of 0.002 inch. The relationship between diameter $d_1$ and diameter $d_2$ will remain the same regardless of the grip length of the fastener. For sake of illustration, the relative dimensions have been exaggerated in the drawings.

As seen in FIG. 9, the collet 11 has been placed around the support section 41 on the pintail portion 14 of fastener pin 10 with the driving face 24 on the leading end of the bearing section 20 bearing against the trailing face 92 on the trailing end of the collet 11. The leading end of the pintail portion 14 of the fastener pin 10 is inserted through the holes H in the work pieces P so that the leading end of the pintail portion 14 is projecting from the offset OS of the work pieces P and the pilot section 85 of the collet 11 is within the holes H adjacent the near side NS of the work pieces P. When a countersunk head fastener pin 10 is used, an appropriate countersink CS would be provided in the near side of the work pieces P. It will be noted that the leading expansion surface 89 is now bearing against the near end of the holes H.

Figure 11:
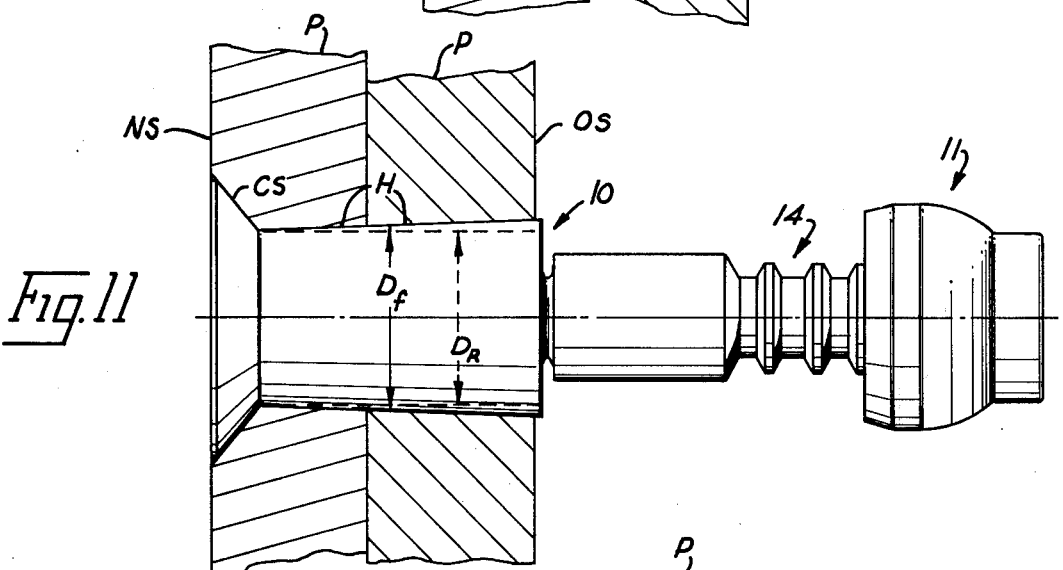
Figure 12:
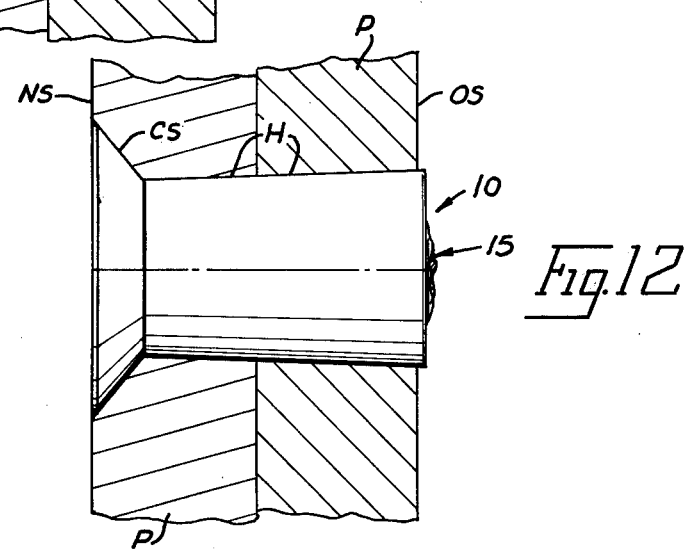

As illustrated in FIG. 10, the nose assembly N of a conventional lockbolt installation gun is inserted over the projecting end of the pintail portion 14 whereby the internal jaws in the nose assembly N grip the pintail portion 14, and when the gun is activated, the nose assembly N pulls the collet 11 through the holes with the bearing section 20 immediately following the collet 11 through the holes until the fastener pin 10 is in the holes with the head 21 bearing against the work pieces. It will be noted that the trailing diameter $d_{10}$ of the collet 11 is slightly larger than the leading diameter $d_1$ of the bearing section 20 so that the leading end of the bearing section 20 can pass into the holes without damaging the hole surface. As the collet 11 moves through the holes H, the holes are expanded over the expansion surface 89 out to the land surface 90 and then are allowed to recover along the contraction surface 91 under the influence of the inward compressive forces on the material immediately adjacent the holes after expansion, the compressive forces exerted thereon by the material of the work pieces farther away from the holes. This causes the holes to recover toward the unrestrained recovered diameter $D_R$ shown by dashed lines in FIG. 11. As the holes recover, they are prevented from fully recovering by the bearing section 20 immediately following the collet 11 to form the interference fit. After the collet 11 has been moved completely through the holes H as seen in FIG. 11, it will be seen that the hole has a final diameter corresponding to the diameters $d_1$ and $d_2$ of the bearing section 20 of fastener pin 10. Because the bearing section 20 prevents the holes from fully recovering, it will be seen that the bearing section 20 is in interference fit with the holes H. If the nose assembly N is of the self-releasing type, the nose assembly can be removed from the pintail portion 14 and then the collet 11 slidably removed therefrom as illustrated being done in FIG. 11. The pintail portion 14 is removed by exerting a lateral rather than axial force thereon to fracture breakneck section 15 to prevent the loss of preload on the final joint.

Figure 13:
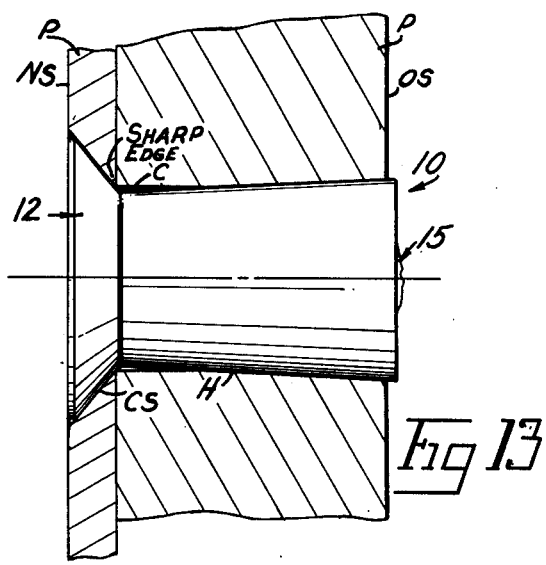

Experimental data has shown that the force required to move an expansion type tapering surface through holes is inversely proportional to the slope. Because the average slope of the expansion surface 89 on the collet 11 is much greater than the slope on the bearing section 20 of the fastener pin 10, it will be seen that the force required to remove the fastener pin 10 from the holes by movement toward the head is significantly greater than the force required to force the fastener pin 10 into the holes with the collet 11 immediately preceeding same as the fastener pin 10 moves toward the pintail portion 14. Thus, the forces of the work pieces P on the fastener pin 10 will always try to further seat the fastener pin 10 in the holes. It will be further seen that if the tension load on the joint is low such as in a shear application, the need for a locking device such as a nut or swagable collar is eliminated. As long as at least the major portion of the bearing surface 22 on the bearing section 20 is in interference bearing contact with the holes H, the fastener will be retained in the holes. In some instances such as that shown in FIG. 13, it may be desirably to leave a slight clearance c about the bearing section 20 of the fastener where the countersink CS forms a sharp edge on thin sheet material. This can be accomplished by adjusting diameter $d_1$ or the hole diameter $D_f$. Still, however, a major portion of the bearing surface 22 is in bearing contact with the holes H to retain the resulting fastener portion 12 in position.

FIGS. 19 and 20 show the first and second modifications of the fastener pin 10' and 10'' installed. It is to be understood that these modifications would be installed in the same manner as the fastener pin 10 using the collet 11 and the dimensional relationships for the reverse taper portion $22_{RT}$ of these modifications would remain similar to those described.

FIG. 25 illustrates the third modified fastener pin $10_I$ being installed. After pin $10_I$ is installed, the pintail portion $14_I$ with expansion member $11_I$ is removed from fastener portion 12 by fracturing the breakneck section $15_I$.

Figure 14:
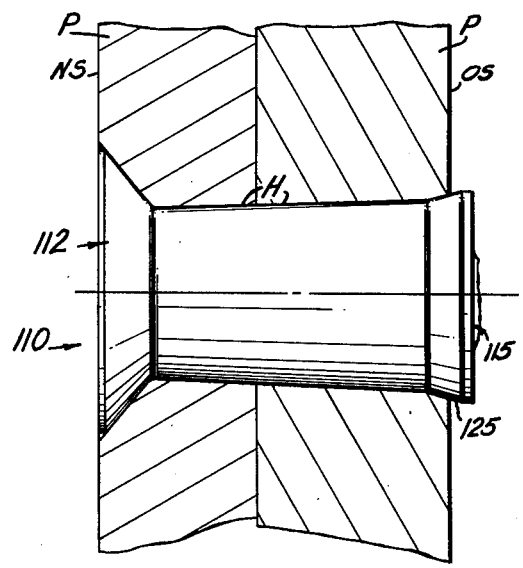
FIG. 14 shows the second embodiment of the invention shown in FIG. 2 installed.

The installation of the second embodiment of the fastener pin 110 is illustrated in FIG. 14 with the dimensional relationship between the bearing section 120 and the collet 111 being the same as those described for pin 10 and collet 11. It will further be noted that the diameter $d_{11}$ of the secondary grip adjustment surface 125 would be no greater than the maximum expansion diameter $d_9$ of the collet 111 so that the grip adjustment section 125 can pass into the holes H without galling. Also, the offside OS of the work pieces P will fall somewhere along the grip adjustment surface 125 and that this grip adjustment surface 125 serves to further increase the force required to remove the fastener portion 12 of the fastener pin 10 from the holes H after installation. The modified fastener pin 110 of FIG. 5 would be installed similarly.

Figure 15:
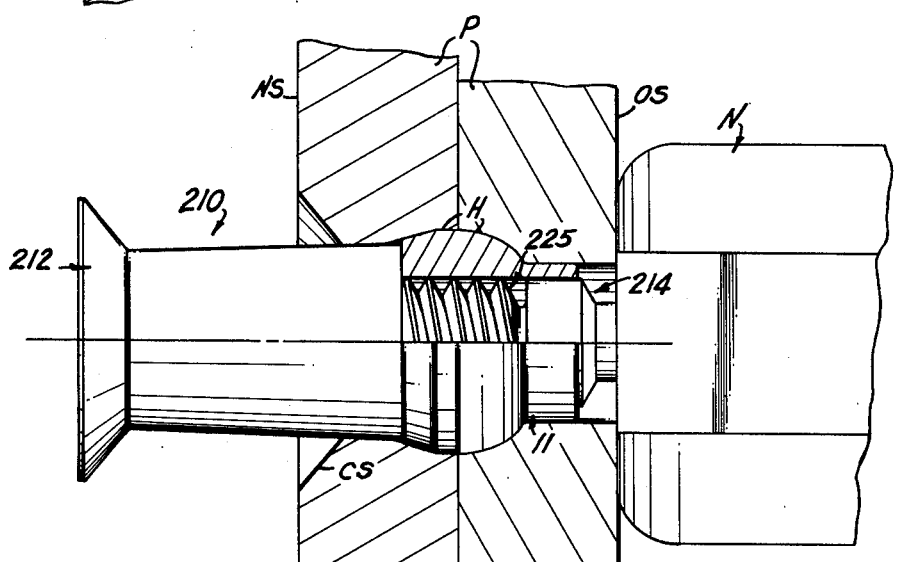
FIG. 15 illustrates the third embodiment of the invention shown in FIG. 3 being installed.
Figure 16:
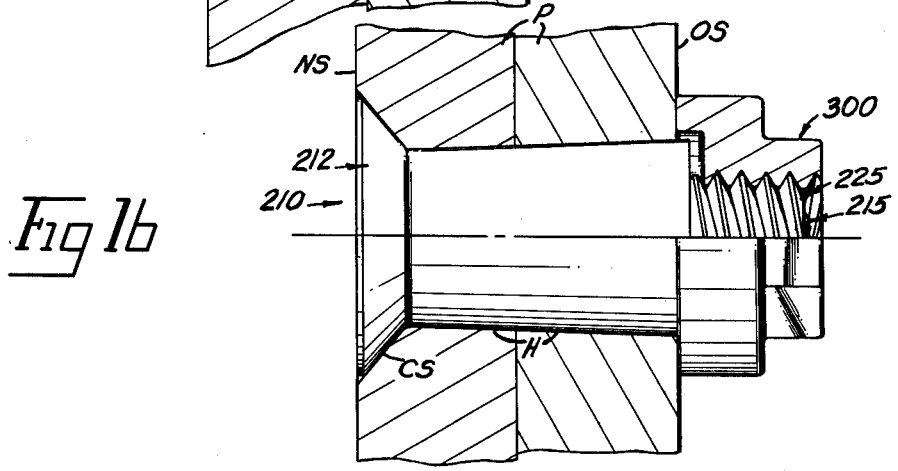
FIG. 16 illustrates the nut of FIGS. 6 and 7 installed on the fastener in FIG. 15.

FIG. 15 illustrates the third embodiment of the fastener pin 210 being installed with the collet 11 thereon. That step of installation illustrated in FIG. 15 would be performed the same as that described for the fastener pin 10. After the fastener pin 210 has been seated, the nose assembly N and the collet 11 are removed and then the pintail portion 214 broken from the leading end of the engagement section 225 at the breakneck section 215 with a lateral force. The nut 300 is then screwed down on the engagement section 225 so that the bearing face 306 of the nut 300 bears against the offside OS of the work pieces P to torque the fastener portion 212 into position. It will be noted that the diameter $d_4$ of the engagement section 225 is considerably smaller than that normally associated with the particular size fastener corresponding to the bearing section 220. For instance, if the bearing section 220 corresponds to a 5/16 inch fastener, then the diameter $d_4$ would correspond to that of the diameter of the engagement section of a ¼ inch fastener. It will also be noted that a standard nut could be screwed onto the threads 226 if a washer is used to clear the leading end of the bearing section 220.

The installation of the modification to the third embodiment of the invention illustrated in FIG. 8 is best seen in FIG. 17 where a swagable collar SC has been placed around the engagement section 225' preceeded by a washer W to clear the leading end of the bearing section 220 as described above. The swagable collar SC is illustrated as being swaged into position in FIG. 17 as would normally complete the installation operation. Finally, the pintail portion 214 would be broken at the breakneck section 215 with a lateral force rather than an axial force to prevent loss of the preload on the resulting fastener joint.

FIG. 18 illustrates the fourth embodiment of the fastener pin 410 with its expansion collet 411. FIG. 18 shows the fastener pin 410 after it has already been placed in the holes H and the collet 411 is being removed therefrom. It will be noted that, as the collet 411 preceeds the fastener portion 412 of the fastener pin through the holes, the holes H recover to the diameter $D_R$ and is then re-expanded over the lead-in surface 426 to place the holes H into interference with the bearing surface 422 on the bearing section 420 of the fastener pin 410. The pintail portion 414 may be broken with a lateral force at this point in the installation and then a conventional nut screwed on the engagement section 425 or the pintail portion 414 may be left intact and used to tension preload the joint independently of the nut and the nut used simply to lock in the prescribed preload in the resulting joint.

METHOD OF FABRICATION

Figure 21:
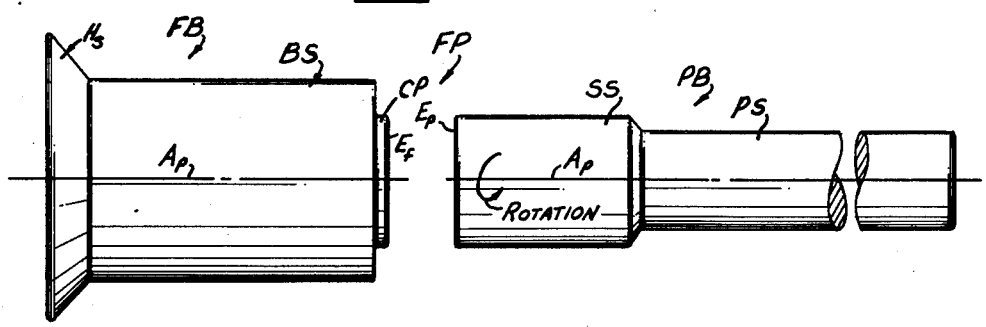
FIGS. 21–23 illustrate a method of manufacturing the invention.
Figure 22:
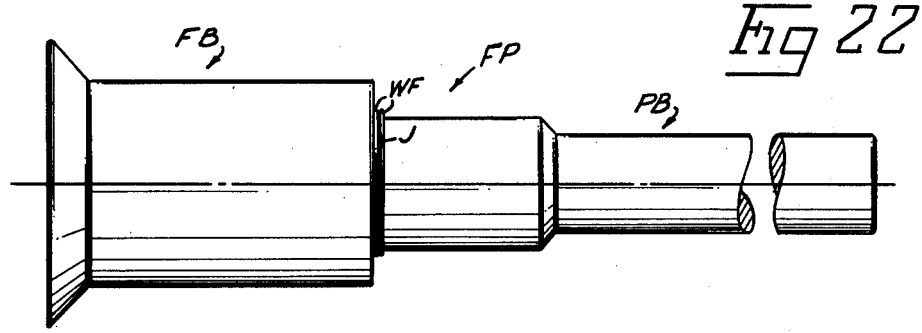
Figure 23:
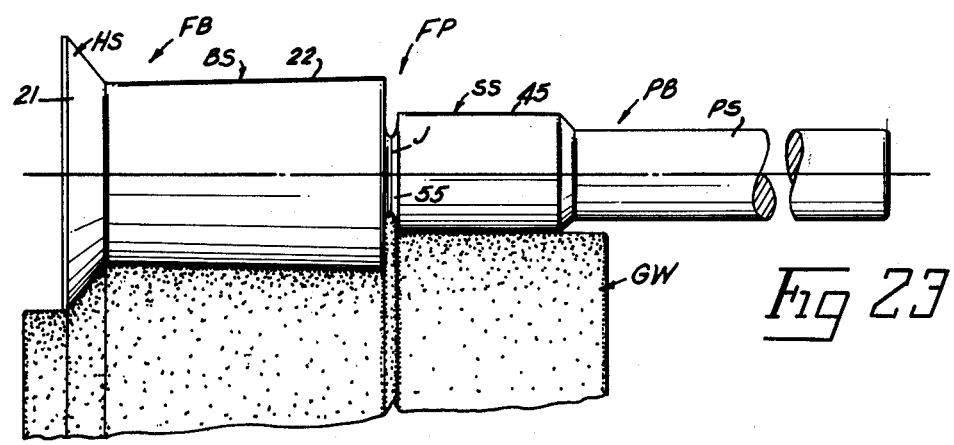

FIGS. 21–23 illustrate a method of fabricating the fastener pins of the invention. As seen in FIG. 21, the fastener pin FP is made using two components, a fastener blank FB that will form the fastener portion of the finished fastener pin and a pintail blank PB that will form the pintail portion of the finished fastener pin. By using two component blanks, the blanks may be made of dissimilar materials as will become more apparent so that the fastener blank FB may be made of a high strength, relatively expensive material as required by the structural design consideration of the finished joint and the pintail blank PB which is discarded after the installation is complete may be made out of a relatively inexpensive material sufficiently strong to pull the finished fastener pin into the holes in the work pieces.

The fabrication method utilizes the inertia welding principle employing a combination of relative rotation between the parts, axial force and inertia to join the blanks FB and PB to each other without the use of a filler materials or exotic atmosphere. The frictional interface between the blanks FB and PB generate the heat needed to weld the blanks together.

The fastener blank FB has a rough sized bearing section BS and a rough sized head section HS that are slightly oversized to the finished sections so that the finished sections can be formed therefrom. The leading end of the fastener blank FB may have a circular projection CP on the face thereof which is coaxial about the central axis $A_p$ of the fastener blank FB. The pintail blank PB has a rough sized pulling section PS thereon from which the fulling section on the pintail will be formed and a rough sized support section SS thereon from which the support section on the pintail will be formed. It will thus be seen that the trailing end $E_p$ of the pintail blank PB is oriented generally normal to the central axis $A_p$ of the pintail blank PB and the leading end $E_f$ of the projection CP on the fastener blank PB is also oriented generally normal to the central axis $A_p$ of the fastener blank FB. With the fastener blank FB and the pintail blank PB oriented coaxially as seen in FIG. 21, relative rotation is generated between the blanks FB and PB with the trailing end $E_p$ of the pintail blank PB facing the leading end $E_f$ on the projection CP of the fastener blank FB. This is usually performed by holding one of the blanks FB or PB stationary while the other blank is rotated at a high rate of speed in a flywheel of a prescribed mass. The pintail blank PB is illustrated in FIG. 21 as that blank being rotated, however, it is to be understood that the pintail blank PB may be held stationary while the fastener blank FB is rotated or the blank FB and the blank PB may be counter-rotated. Usually, the blank being rotated is housed within the flywheel which has a certain mass and after the blank such as the pintail blank PB is rotated up to a prescribed speed, the rotation driving force is removed and the blanks FP and PB are forced together so that the trailing end $E_p$ of the pintail blank PB frictionally engages the leading end $E_f$ of fastener blank FB. As the kinetic energy of the flywheel carrying the pintail blank PB is absorbed at the frictional interface between the ends $E_p$ and $E_f$ and dissipated as heat at this interface, the heat generated by the kinetic energy is sufficient to weld the ends $E_p$ and $E_f$ together by the time the kinetic energy of the spinning flywheel has been absorbed at the interface. The blanks are illustrated in FIG. 22 as having been welded together using this technique. It will be noted, that in the welding process, welding flash material WF is extruded out around the welded joint. The fastener pin blank FP is now ready for subsequent finishing operations with the pintail blank PB integral with the leading end of the fastener blank FB through the welded joint J.

While different techniques may be used to finish the fastener pin blank FP, FIG. 23 shows the blank FP being partially finished by a grinding process. A grinding wheel GW which has an external configuration complimentary to the desired configuration of the support section of the pintail blank PB, the bearing section of the fastener blank FB and the head of the fastener blank FB is used to grind away the flash material WF, size the support section SS on the pintail blank PB to form the support surface 45, form the breakneck groove 55 at the juncture between the pintail blank PB and fastener blank FB, usually centered on the weld joint J between the two blanks, size the bearing section to form the bearing surface 22 on fastener blank FB and finish the head section to form the head 21. It is to be understood that while the blank for the fastener pin 10 is illustrated, this technique could likewise be used for the other fastener pins illustrated with the weld being made at that position on the blank at which the breakneck groove is to be located. After the grinding operation, the ridges and grooves may be rolled in the pulling section PS of blank PB to finish the fastener pin.

While specific embodiments of the invention have been disclosed herein, it is to be understood that full use may be made of modifications, substitutions and equivalents without departing from the scope of the invention.

I claim:

1. A fastener for connecting work pieces with aligned holes therethrough comprising:

an elongate bearing section adapted to extend through the holes, said bearing section having a leading end, a trailing end and a central axis, and said bearing section defining an exterior bearing surface thereon concentric about said central axis and tapering inwardly along said bearing section from a prescribed leading major bearing diameter adjacent the leading end of said bearing section larger than the diameter of the holes in the work pieces to a prescribed trailing minor bearing diameter trailing said leading major diameter and smaller than said first prescribed diameter;

an enlarged head integral with the trailing end of said bearing section;

an engagement section integral with the leading end of said bearing section having a major outside engagement diameter smaller than said leading major bearing diameter, said bearing section further defining an annular leading face on the leading end of said bearing section about said engagement section and oriented generally normal to the central axis of said fastener;

a pintail coaxially arranged about said central axis and opertively connected to the leading end of said bearing section, said pintail adapted to be engaged to install said bearing section in the holes; and, an expansion collet removably and operatively associated with and leading said bearing section, said expansion collet defining an expansion surface thereon concentric about said central axis, said expansion surface having a leading minor expansion diameter at least as small as the diameter of the holes and a trailing major expansion diameter at least as large as said leading major bearing diameter of said bearing section, said section, said expansion collet defining an annular driven face on the trailing end thereof oriented generally normal to said central axis and engaged by said leading face on said bearing section to force said expansion collet through the holes.

2. The fastener of claim 1 wherein said major outside engagement diameter is smaller than the leading minor expansion diameter of said expansion collet; and wherein said expansion collet defines a central support passage therethrough concentric about said central axis, said support passage sized so that said expansion collet is slidably receivable over said engagement section until said driven face on said expansion collet is engaged by said driving face on said bearing section and said expansion collet is supported on said engagement section.

3. The fastener of claim 2 wherein said engagement section is externally threaded.

4. The fastener of claim 2 wherein said expansion collet further defines a pilot surface thereon concentric about said central axis and leading said expansion surface, said pilot surface having a prescribed pilot diameter along its length substantially equal to the hole diameter so that said pilot surface maintains the fastener coaxial with the holes in the work pieces as the fastener is forced into the holes.

5. The fastener of claim 4 further including a frangible section integrally connecting said pintail to the leading end of said engagment section so that said frangible section can be fractured to separate said pintail from said engagement section.

6. The fastener of claim 5 including an internally threaded locking member adapted to threadedly engage said engagement section, said locking member defining an adjustment recess concentric about a central axis facing said bearing section and having a recess diameter larger than said leading major diameter to receive the leading end of said bearing section therein.

7. A fastener joint comprising:
a plurality of work pieces defining aligned holes therethrough; and,
a fastener assembly in said holes, said fastener assembly including a fastener and an expansion member removably and operatively associated with said fastener, said fastener including an elongate bearing section having a leading end and a trailing end extending through said holes, and an enlarged head integral with the trailing end of said bearing section and coaxially arranged with said bearing section about the central axis of said fastener assembly, said bearing section defining an exterior bearing surface thereon, said bearing surface tapering inwardly from a prescribed leading major bearing diameter adjacent the leading end of said bearing section opposite said head to a prescribed trailing minor bearing diameter less than said leading major bearing diameter and trailing said major bearing diameter, said bearing section defining a leading driving face on the leading end thereof oriented generally normal to said central axis and joining with the leading end of said bearing surface, and said expansion member defining an expansion surface thereon concentric about said central axis, said expansion surface defining a leading minor expansion diameter at least as small as the initial diameter of the holes in the work pieces prior to insertion of the fastener assembly and a trailing major expansion diameter at least as large as said leading major bearing diameter of said bearing section, said expansion member further defining a driven face on the trailing end thereof oriented generally normal to said central axis and adjoining the trailing end of said expansion surface so that said leading driving face on said bearing section of said fastener engages said trailing driven face on said expansion member, said holes having been expanded from the initial substantially constant diameter along the length of said holes smaller than said major bearing diameter to an expanded diameter by said expansion member being forced through said holes immediately preceeding said bearing section at least as large as said leading major bearing diameter of said bearing surface as said bearing section is installed in said holes and said holes having a normal unrestrained recovered diameter smaller than said major bearing diameter of said bearing surface after expansion, said work pieces in bearing contact with at least a major portion of said bearing surface.

8. The fastener joint of claim 7 wherein said normal recovered diameter of said holes is also smaller than said trailing minor bearing diameter of said bearing surface, and wherein said work pieces are in bearing contact with substantially all of said bearing surface within said holes.

9. The fastener joint of claim 8 wherein said fastener has a grip length substantially equal to the length of said holes.

10. The fastener joint of claim 7 wherein said trailing minor bearing diameter is adjacent the trailing end of said bearing section and wherein said exterior bearing surface tapers uniformly inwardly from said leading major bearing diameter to said trailing minor bearing diameter.

11. The fastener joint of claim 7 wherein said trailing minor bearing diameter trails said leading major bearing diameter by a prescribed distance less than the length of said bearing section and wherein said exterior bearing surface includes a leading reverse taper surface section uniformly tapering inwardly from said leading major bearing diameter to said trailing minor bearing diameter and a trailing surface section extending between said leading reverse taper surface section and said trailing end of said bearing section, said trailing surface section having a substantially constant diameter along its length substantially equal to said minor bearing diameter.

12. The fastener joint of claim 7 wherein said trailing minor bearing diameter trails said leading major bearing diameter by a prescribed distance less than the length of said bearing section and wherein said exterior bearing surface includes a leading reverse taper surface section uniformly tapering inwardly from said leading major bearing diameter to said trailing minor bearing diameter and a trailing forward taper surface section extending between said leading reverse taper surface section and said trailing end of said bearing section, said trailing forward taper surface section tapering uniformly outwardly from said trailing minor bearing diameter to a further prescribed trailing secondary major bearing diameter adjacent said trailing end of said bearing section, said trailing secondary major bearing diameter larger than said trailing minor diameter and said normal recovered diameter of said holes.

13. The fastener joint of claim 7 wherein said holes have been expanded from the initial diameter sufficiently to cause the material of the work pieces immediately adjacent the holes to have a compressive stress gradient induced therein when said holes are in bearing contact with said bearing surface.

14. A fastener assembly for use in connecting work pieces with aligned holes therethrough of a prescribed hole diameter comprising:
   a fastener including an elongate bearing section adapted to extend through the holes and an enlarged head, said bearing section having a leading end, a trailing end and a fastener central axis, and said bearing section defining an exterior bearing surface thereon concentric about said fastener central axis and tapering inwardly along said bearing section from a prescribed leading major bearing diameter adjacent the leading end of said bearing section larger than the hole diameter in the work pieces to a prescribed trailing minor bearing diameter trailing said leading major bearing diameter and smaller than said major bearing diameter, said bearing section defining a leading drive face on the leading end thereof oriented generally normal to said fastener central axis and joining with the leading end of said bearing surface, and said enlarged head integral with the trailing end of said bearing section; and,
   an expansion member removably and operatively associated with said fastener and leading said bearing section, said expansion member having an expansion central axis and defining an expansion surface thereon concentric about said expansion central axis, said expansion surface defining a leading minor expansion diameter at least as small as the hole diameter in the work pieces and a trailing major expansion diameter at least as large as said leading major bearing diameter of said bearing section on said fastener, said expansion member further defining a driven face on the trailing end thereof oriented generally normal to said expansion central axis and joining the trailing end of said expansion surface so that when said expansion member is operatively associated with said fastener with said expansion central axis coaxial with said fastener central axis, said leading driving face on said bearing section of said fastener will engage said trailing driven face on said expansion member to force said expansion member through said holes immediately preceeding said fastener to expand said holes sufficiently to allow said bearing section of said fastener to pass into said holes.

15. The fastener of claim 14 wherein said trailing minor bearing diameter is adjacent the trailing end of said bearing section and wherein said exterior bearing surface tapers uniformly inwardly from said leading major diameter to said trailing minor diameter.

16. The fastener of claim 14 wherein said trailing minor bearing diameter trails said leading major diameter by a prescribed distance less than the length of said bearing section and wherein said exterior bearing surface includes a leading reverse taper surface section uniformly tapering inwardly from said leading major bearing diameter to said trailing minor bearing diameter and a trailing surface section extending between said leading reverse taper surface section and said trailing end of said bearing section, said trailing surface section having a substantially constant diameter along its length substantially equal to said minor bearing diameter.

17. The fastener of claim 16 wherein said leading reverse taper surface section has a length such that said leading reverse taper surface section extends along a major portion of the length of said bearing section.

18. The fastener of claim 14 wherein said trailing minor bearing diameter trails said leading major bearing diameter by a prescribed distance less than the length of said bearing section and wherein said exterior bearing surface includes a leading reverse taper surface section uniformly tapering inwardly from said leading major bearing diameter to said trailing minor bearing diameter and a trailing forward taper surface section extending between said leading reverse taper surface section and said trailing end of said bearing section, said trailing forward taper surface section tapering uniformly outwardly from said trailing minor bearing diameter to a further prescribed trailing secondary major bearing diameter adjacent said trailing end of said bearing section, said trailing secondary major bearing diameter larger than said trailing minor bearing diameter.

19. The fastener of claim 18 wherein said leading reverse taper surface section has a length such that said leading reverse taper surface section extends along a major portion of the length of said bearing section.

20. The fastener assembly of claim 14 wherein the diameter of said expansion surface at its juncture with said driven face on said expansion member is at least as large as the diameter of said bearing surface at its juncture with said driving face on said fastener to prevent removal of material from the work pieces about the holes as said fastener is forced into the holes.

21. The fastener assembly of claim 20 further including alignment means for maintaining coaxial alignment between said fastener and said expansion member so that said expansion central axis is maintained coaxial with said fastener central axis as said fastener assembly is forced into the holes.

22. The fastener assembly of claim 20 wherein said fastener further includes an elongate pintail operatively connected to the leading end of said bearing section so that said pintail is coaxial with said fastener central axis and so that said pintail can be engaged to pull said fastener and said expansion member into the holes, said pintail defining an outside support surface thereon having an outside support diameter smaller than the leading minor expansion diameter of said expansion member; and wherein said expansion member defines a central support passage therethrough concentric about said expansion central axis, said support passage sized so that said expansion member is slidably receivable over said pintail until said driven face on said expansion member is engaged by said driving face on said fastener and said expansion member is supported by said outside support surface on said pintail so that the expansion central axis is coaxial with said fastener central axis.

23. The fastener of claim 22 including a frangible section integrally connecting said pintail to the leading end of said bearing section so that said frangible section can be fractured to separate said pintail from said bearing section.

24. The fastener assembly of claim 22 wherein said expansion member further defines a pilot surface thereon concentric about said expansion central axis and leading said expansion surface, said pilot surface having a prescribed pilot diameter along its length substantially equal to the hole diameter so that said pilot surface maintains said fastener coaxial with the holes in the work pieces as the fastener is forced into the holes.

25. The fastener of claim 24 wherein said trailing minor bearing diameter trails said leading major diameter by a prescribed distance less than the length of said bearing section and wherein said exterior bearing surface includes a leading reverse taper surface section uniformly tapering inwardly from said leading major bearing diameter to said trailing minor bearing diameter and a trailing surface section extending between said leading reverse taper surface section and said trailing end of said bearing section, said trailing surface section having a substantially constant diameter along its length substantially equal to said minor bearing diameter.

26. The fastener of claim 24 wherein said trailing minor bearing diameter trails said leading major bearing diameter by a prescribed distance less than the length of said bearing section and wherein said exterior bearing surface includes a leading reverse taper surface section uniformly tapering inwardly from said leading major bearing diameter to said trailing minor bearing diameter and a trailing forward taper surface section extending between said leading reverse taper surface section and said trailing end of said bearing section, said trailing forward taper surface section tapering uniformly outwardly from said trailing minor bearing diameter to a further prescribed trailing secondary major bearing diameter adjacent said trailing end of said bearing section, said trailing secondary major bearing diameter larger than said trailing minor bearing diameter.

27. A fastener assembly for use in connecting work pieces with aligned holes therethrough of a prescribed hole diameter comprising:
a fastener including an elongate bearing section adapted to extend through the holes and an enlarged head, said bearing section having a leading end, a trailing end and a fastener central axis, said bearing section defining an exterior primary bearing surface thereon concentric about said fastener central axis and tapering inwardly along said bearing section from a prescribed leading major bearing diameter larger than the hole diameter in the work pieces trailing the leading end of said bearing section by a first prescribed distance to a prescribed trailing minor bearing diameter trailing said leading major bearing diameter and smaller than said major bearing diameter, said bearing section further defining a secondary grip variation exterior surface extending from said primary bearing surface to the leading end of said bearing section, said second grip variation surface being concentric about said central axis and tapering outwardly from said leading major bearing diameter to a gripping diameter larger than said leading major bearing diameter and leading said primary bearing surface, said bearing section defining a leading driving face on the leading end thereof oriented generally normal to said fastener central axis and joining with the leading end of said grip variation surface, and said enlarged head integral with the trailing end of said bearing section; and,
an expansion member removably and operatively associated with said fastener and leading said bearing section, said expansion member having an expansion central axis and defining an expansion surface thereon concentric about said expansion central axis, said expansion surface defining a leading minor expansion diameter at least as small as the hole diameter in the work pieces and a trailing major expansion diameter at least as large as said gripping diameter of said grip variation surface on said fastener, said expansion member further defining a driven face on the trailing end thereof oriented generally normal to said expansion central axis and joining the trailing end of said expansion surface so that when said expansion member is operatively associated with said fastener with said expansion central axis coaxial with said fastener central axis, said leading driving face on said fastener will engage said trailing driven face on said expansion member to force said expansion member through said holes immediately preceeding said fastener to expand said holes sufficiently to allow said secondary grip variation surface and said primary bearing surface on said bearing section of said fastener to pass into said holes.

28. A fastener assembly for use in connecting work pieces with aligned holes therethrough of a prescribed hole diameter comprising:
a fastener including an elongate bearing section adapted to extend through the holes an enlarged head and an engagement section, said bearing section having a leading end, a trailing end and a fastener central axis, and said bearing section defining an exterior primary bearing surface thereon concentric about said fastener central axis and tapering inwardly along said bearing section from a prescribed leading major bearing diameter larger than the hole diameter in the work pieces and trailing the leading end of said bearing section by a first prescribed distance to a prescribed trailing minor bearing diameter trailing said leading major bearing diameter and smaller than said major bearing diameter, said bearing section further defining a re-expansion surface on the leading end thereof tapering inwardly from said major bearing diameter of said primary bearing surface to a leading minor re-expansion diameter at the leading end of said bearing section smaller than said leading major bearing diameter, said engagement section integral with the leading end of said bearing section, leading said bearing section, and concentric about said fastener central axis, said engagement section having a major engagement diameter substantially equal to said minor re-expansion diameter, and said engagement section defining a leading driving face on the leading end thereof oriented generally normal to said fastener central axis, and,
an expansion member removably and operatively associated with said fastener and leading said engagement section, said expansion member having an expansion central axis and defining an expansion surface thereon concentric about said expansion central axis, said expansion surface defining a leading minor expansion diameter at least as small as the hole diameter in the work pieces and a trailing major bearing diameter at least as large as said leading major bearing diameter of said bearing section on said fastener, said expansion member further defining a driven face on the trailing end thereof oriented generally normal to said expansion central axis so that said expansion member is operatively associated with said fastener with said expansion central axis coaxial with said fastener central axis, said leading driving face on said engagement section of said fastener will engage said trailing driven face on said expansion member to force said expansion member through said holes immediately preceeding said fastener to expand said holes sufficiently to allow said bearing section of said fastener to pass into said holes.

* * * * *